US010922803B2

(12) United States Patent
Herchenbach et al.

(10) Patent No.: US 10,922,803 B2
(45) Date of Patent: Feb. 16, 2021

(54) DETERMINING CLEAN OR DIRTY CAPTURED IMAGES

(71) Applicant: FICOSA ADAS, S.L.U., Barcelona (ES)

(72) Inventors: Daniel Herchenbach, Barcelona (ES); Anas Mhana, Barcelona (ES); Sebastian Carreno, Barcelona (ES); Robin Lehmann, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 157 days.

(21) Appl. No.: 16/198,499

(22) Filed: Nov. 21, 2018

(65) Prior Publication Data

US 2019/0164271 A1    May 30, 2019

(30) Foreign Application Priority Data

Nov. 24, 2017  (EP) .................................... 17382793

(51) Int. Cl.
 *G06T 7/00*    (2017.01)
 *G06K 9/00*    (2006.01)
 (Continued)

(52) U.S. Cl.
 CPC ........ *G06T 7/0002* (2013.01); *G06K 9/00791* (2013.01); *G06K 9/4638* (2013.01);
 (Continued)

(58) Field of Classification Search
 CPC ......... G06T 7/0002; G06T 2207/30168; G06T 2207/30232; G06T 2207/30252;
 (Continued)

(56) References Cited

U.S. PATENT DOCUMENTS 6,097,024 A    8/2000  Stam et al.
9,412,030 B2*  8/2016  Bocharov ............... G06T 5/005
(Continued)

FOREIGN PATENT DOCUMENTS

DE    10322087 A1    12/2004
GB     2550032 A    11/2017

OTHER PUBLICATIONS

European Search Report for Application No. 17382793.2, dated Jun. 6, 2018, 9 pages.

*Primary Examiner* — Xuemei G Chen
(74) *Attorney, Agent, or Firm* — Brooks Kushman P.C.

(57) ABSTRACT

Methods are provided for determining whether an image captured by a capturing device is clean or dirty. These methods include: receiving the image captured by the image capturing device; splitting the received image into a plurality of image portions according to predefined splitting criteria; performing, for each of at least some of the image portions, a Laplacian filter of the image portion to produce a feature vector including Laplacian filter features of the image portion; providing the feature vectors to a first machine learning module that has been trained to produce a clean/dirty indicator depending on corresponding feature vector, the clean/dirty indicator including a probabilistic value of cleanness or dirtiness of corresponding image portion; and determining whether the image is clean or dirty depending on the clean/dirty indicators produced by the first machine learning module. Systems and computer programs suitable for performing such methods are also provided.

18 Claims, 4 Drawing Sheets

(51) Int. Cl.
  *G06K 9/46* (2006.01)
  *G06K 9/62* (2006.01)
(52) U.S. Cl.
  CPC .. *G06K 9/6269* (2013.01); *G06T 2207/10021* (2013.01); *G06T 2207/20021* (2013.01); *G06T 2207/20024* (2013.01); *G06T 2207/20076* (2013.01); *G06T 2207/20081* (2013.01); *G06T 2207/30168* (2013.01); *G06T 2207/30232* (2013.01); *G06T 2207/30252* (2013.01)
(58) Field of Classification Search
  CPC . G06T 2207/10021; G06T 2207/20024; G06T 2207/20076; G06T 2207/20021; G06T 2207/20081; G06K 9/00791; G06K 9/4638; G06K 9/6269
  See application file for complete search history.

(56) References Cited

U.S. PATENT DOCUMENTS

| | | | | |
|---|---|---|---|---|
| 9,576,219 | B2 * | 2/2017 | Piatrou | G06T 7/70 |
| 9,697,444 | B2 * | 7/2017 | Wu | G06K 9/4628 |
| 10,115,040 | B2 * | 10/2018 | Brauer | G01N 21/88 |
| 10,185,892 | B1 * | 1/2019 | Mishra | G06K 9/66 |
| 10,186,026 | B2 * | 1/2019 | Karsenti | G06K 9/6256 |
| 10,453,366 | B2 * | 10/2019 | Zhang | G09G 3/006 |
| 10,607,331 | B1 * | 3/2020 | Tandia | G06T 7/11 |
| 2006/0147107 | A1 * | 7/2006 | Zhang | G06T 7/0002 382/159 |
| 2007/0280552 | A1 * | 12/2007 | Lee | H04N 19/86 382/268 |
| 2008/0226148 | A1 * | 9/2008 | Gu | G06T 7/0002 382/128 |
| 2009/0174773 | A1 | 7/2009 | Gowdy et al. | |
| 2011/0182495 | A1 * | 7/2011 | Sun | G06T 7/48 382/141 |
| 2015/0356461 | A1 * | 12/2015 | Vinyals | G06N 7/00 706/12 |
| 2016/0260135 | A1 * | 9/2016 | Zomet | H04L 12/2834 |
| 2017/0249769 | A1 | 8/2017 | Fried et al. | |
| 2018/0005026 | A1 * | 1/2018 | Shaburov | A63F 13/52 |
| 2018/0005666 | A1 * | 1/2018 | Yang | G06T 7/97 |
| 2018/0107928 | A1 * | 4/2018 | Zhang | G06N 3/0454 |
| 2018/0114092 | A1 * | 4/2018 | Huang | G06K 9/4642 |
| 2018/0157933 | A1 * | 6/2018 | Brauer | G06N 3/0454 |
| 2018/0232601 | A1 * | 8/2018 | Feng | G06K 9/6263 |
| 2018/0268257 | A1 * | 9/2018 | Ren | G06K 9/6256 |
| 2018/0315076 | A1 * | 11/2018 | Andreou | G06Q 30/0244 |
| 2019/0035047 | A1 * | 1/2019 | Lim | H04N 9/045 |
| 2019/0073804 | A1 * | 3/2019 | Allmendinger | G06T 7/0012 |
| 2019/0114756 | A1 * | 4/2019 | Weiss | G06T 7/10 |
| 2019/0139213 | A1 * | 5/2019 | Kurita | G06T 7/0002 |
| 2019/0246477 | A1 * | 8/2019 | Sinitsyn | H05B 47/105 |
| 2019/0258890 | A1 * | 8/2019 | Lee | G09G 5/026 |
| 2019/0287234 | A1 * | 9/2019 | Panda | G06T 7/90 |
| 2020/0096454 | A1 * | 3/2020 | Konishi | H01Q 1/28 |
| 2020/0175352 | A1 * | 6/2020 | Cha | G06N 3/08 |

\* cited by examiner

DETERMINING CLEAN OR DIRTY CAPTURED IMAGES

CROSS-REFERENCE TO RELATED APPLICATIONS

This application claims priority to EP application Serial No. EP17382793.2 filed Nov. 24, 2017, the disclosure of which is hereby incorporated in its entirety by reference herein.

TECHNICAL FIELD

The present disclosure relates to methods of determining whether an image captured by a capturing device is clean or dirty, and to computer programs, systems and computing systems suitable for performing such methods.

BACKGROUND

Different methods and systems for monitoring the operation of a capturing device (e.g., a camera) are known in the state of the art, with the aim of determining whether e.g., an image captured by the capturing device is clean or dirty. Dirty captured images (due to e.g., a dirty "external" lens of corresponding camera) may not be reliable and, therefore, not usable in corresponding application. For example, an obstacle detection system in a vehicle may become unusable due to bad quality of the images from corresponding on-board camera simply because the lens through which images are captured is not clean enough. A lens may become dirty as a result of e.g. dust accumulation, mud splashes, malicious paintings, etc. Dirty captured images may also result from anomalous internal conditions in the camera (e.g., humidity) negatively affecting internal components of the camera. For example, an internal capturing sensor may distortedly function due to anomalous conditions caused by e.g., deficient water tightness of the camera.

An on-board camera may also be used as a rear-view mirror. In this case, captured images are showed on a display that may be viewed by the driver when the driver is in driving position. A car may have at least two rear-view mirrors of this type (with corresponding camera). It is important also in these rear-view mirror systems that images captured by the camera are reasonably clean.

Cleanness or dirtiness of the lens of a camera may refer to e.g., cleanness or dirtiness of the external surface of the lens, i.e., the surface of the lens which is exposed to environmental conditions that may cause dirtiness on the lens. If the lens is provided with external protector lamina(s), cleanness or dirtiness of the lens is understood as cleanness or dirtiness of such protector lamina(s).

Imaging systems are known including an image sensor and a transparent protective layer formed within the field-of-view of the image sensor. Such imaging systems include a light source that emits light in a predetermined pattern. These imaging systems include detection of a reflected version of the predetermined pattern of light in image data captured by image sensor. The imaging system then determines whether an obstruction is present within the field-of-view of the image sensor, depending on the reflected version of the predetermined pattern.

Imaging devices for imaging areas of the environment are also known. Information is acquired by the devices on objects and texture present within a field of view of the imaging device. An object or texture present within the field of view is then recognized by the imaging device. Degrees of distortion of a shape or texture of the recognized object are calculated based on the shape or texture of the recognized object and information previously acquired on the objects or texture. Cleanness or dirtiness of corresponding lens may then be determined based on the degrees of distortion calculated from the shape or texture of the recognized object.

Other known detection devices focus on the fact that the heavier the lens dirtiness on a camera is, the larger the change in the composite wave of the image becomes. These devices detect presence or absence of lens dirtiness on the camera by extracting respective image frequency components of the composite wave, and analysing a change in the size relationship between these frequency components (distribution of the image frequency powers) regardless of a background image.

An object of the present disclosure is improving the prior art methods, computer programs and systems aimed at determining whether an image captured by a capturing device is clean or dirty.

SUMMARY

In a first aspect, a method of determining whether an image captured by a capturing device is clean or dirty is provided. The method comprises receiving the image captured by the image capturing device and splitting the received image into a plurality of image portions according to predefined splitting criteria.

The method further comprises performing, for each of at least some of the image portions, a Laplacian filter of the image portion to produce a feature vector including Laplacian filter features of the image portion.

The method still further comprises providing each of at least some of the produced feature vectors to a first machine learning module that has been trained to produce a clean/dirty indicator depending on corresponding feature vector, the clean/dirty indicator including a probabilistic value of cleanness or dirtiness of corresponding image portion.

The method yet further comprises determining whether the image is clean or dirty depending on the clean/dirty indicators produced by the first machine learning module.

As commented before, dirtiness in a captured image may be due to a diversity of reasons, such as e.g., dust accumulation, mud splashes, malicious paintings, etc. on a lens of corresponding camera. Dirty captured images may also result from anomalous internal conditions in the camera (e.g., humidity) negatively affecting internal components of the camera. For example, an internal capturing sensor may distortedly function due to anomalous conditions caused by e.g., deficient water tightness of the camera. In this sense, the following equivalences between expressions may be assumed throughout the present disclosure.

| Expression used herein | Equivalent expression |
| --- | --- |
| determining whether captured image is clean or dirty | determining specklessness of captured image |
| clean captured image | Speckle free captured image |
| dirty captured image | non-speckle free captured image |
| clean/dirty indicator | speckle indicator |
| clean/dirty threshold | speckle threshold |
| clean portions/cells | speckle free portions/cells |
| dirty portions/cells | non-speckle free portions/cells |
| clean block | speckle free block |
| dirty block | non-speckle free block |
| cleanness/dirtiness | specklessness |
| Etcetera . . . | |

The inventors identified that Laplacian filter features such as e.g., kurtosis, mean, variance, moments, average grey value, etc. calculated from an image may surprisingly provide reliable indications of cleanness/dirtiness of (portions of) corresponding image. The inventors further identified that the reliable correlation or correspondence between Laplacian filter features and cleanness/dirtiness condition may be effectively and flexibly implemented through machine learning techniques. The proposed method therefore provides a reliable manner of automatically detecting a cleanness/dirtiness level of the image(s) captured by the camera. And additionally, the suggested method permits incrementally improving its reliability by training regularly or punctually the first machine learning module, which may comprise e.g., a linear classifier, a support vector machine (SVM), etc.

A divide and conquer strategy is applied in the proposed method, by splitting the captured image into portions which are individually subjected to Laplacian filter. Then, resulting Laplacian filter features are provided to classifier (or similar module) to produce clean/dirty indicators at portion level. Finally, a state of the whole image is determined depending on the clean/dirty indicators. The image may be divided into (more or less) bigger or smaller portions so that a good balance between accuracy and efficiency may be achieved. Smaller portions may improve accuracy of the method, while bigger portions may improve its efficiency (execution time). Experimental executions of the method may be performed to find most suitable splitting criteria satisfying desired accuracy and efficiency requirements. Splitting criteria may be re-adjusted as many times as needed to ensure best balance between accuracy and efficiency along life cycle of the method (and corresponding software).

Different approaches or combinations thereof may be considered for determining the clean/dirty state of the captured image as a whole. In a first approach, the clean/dirty indicators at portion level may be aggregated, and resulting aggregation may be compared with corresponding threshold to determine cleanness or dirtiness of the image. In a second approach, a number of clean portions (or dirty portions) may be determined depending on the clean/dirty indicators at portion level, and the number of clean portions (or dirty portions) may be compared with corresponding threshold to determine cleanness or dirtiness of the image. In a third approach, a second machine learning module may be used to generate a state of the image depending on the clean/dirty indicators. Details about these approaches are provided in other parts of the disclosure.

Different filters may be applied to the captured image at pixel or portion/indicator level for improving the conditions under which the image is processed in methods according to the present disclosure. A context-based filter may be applied at portion/indicator level based on an edge/sharpness analysis to correct potentially false dirtiness detections. A time filter may be performed at portion/indicator level to identify clean/dirty indicators as outliers and subsequently correct/discard the outliers. A Laplacian filtering may be carried out at pixel level to facilitate the aforementioned edge/sharpness analysis. Details about these filters are provided in other parts of the disclosure.

In a second aspect, a computer program is provided comprising program instructions for causing a system (e.g. computing system) to perform any of the above methods of determining whether an image captured by a capturing device is clean or dirty. The computer program may be embedded on a storage medium and/or carried on a carrier signal.

In a third aspect, a system is provided for determining whether an image captured by a capturing device is clean or dirty. The system comprises a receptor module to receive the image captured by the image capturing device, and a splitter module to split the received image into a plurality of image portions according to predefined splitting criteria.

The system further comprises a filter module to perform, for each of at least some of the image portions, a Laplacian filter of the image portion to produce a feature vector including Laplacian filter features of the image portion.

The system further comprises a provider module to provide each of at least some of the produced feature vectors to a first machine learning module that has been trained to produce a clean/dirty indicator depending on corresponding feature vector, the clean/dirty indicator including a probabilistic value of cleanness or dirtiness of corresponding image portion.

The system yet further comprises a state-determiner module to determine whether the image is clean or dirty depending on the clean/dirty indicators produced by the first machine learning module.

The system (i.e., the modules comprised therein) may be implemented by hardware (e.g., electrical device(s)) or a combination hardware and software, as described in more detail in other parts of the disclosure.

As used herein, the term "module" may be understood to refer to software, hardware, and/or a combination of hardware and software thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Further, the modules may be implemented across multiple devices and/or other components local or remote to one another. Additionally, the modules may be moved from one device and added to another device, and/or may be included in both devices. Any software implementations may be tangibly embodied in one or more storage media, such as, for example, a memory device, a floppy disk, a compact disk (CD), a digital versatile disk (DVD), or other devices that may store computer code.

In some examples, a vehicle vision system may be provided comprising any of the previously described systems for determining whether an image captured by a capturing device is clean or dirty. A vehicle comprising such a vision system may also be provided. The vehicle may be a car. The image capturing device may be a camera or a LIDAR or similar device.

These and other advantages and features will become apparent in view of the detailed description and drawings.

BRIEF DESCRIPTION OF THE DRAWINGS

Non-limiting examples of the present disclosure will be described in the following, with reference to the appended drawings, in which.

DETAILED DESCRIPTION

Figure 1:
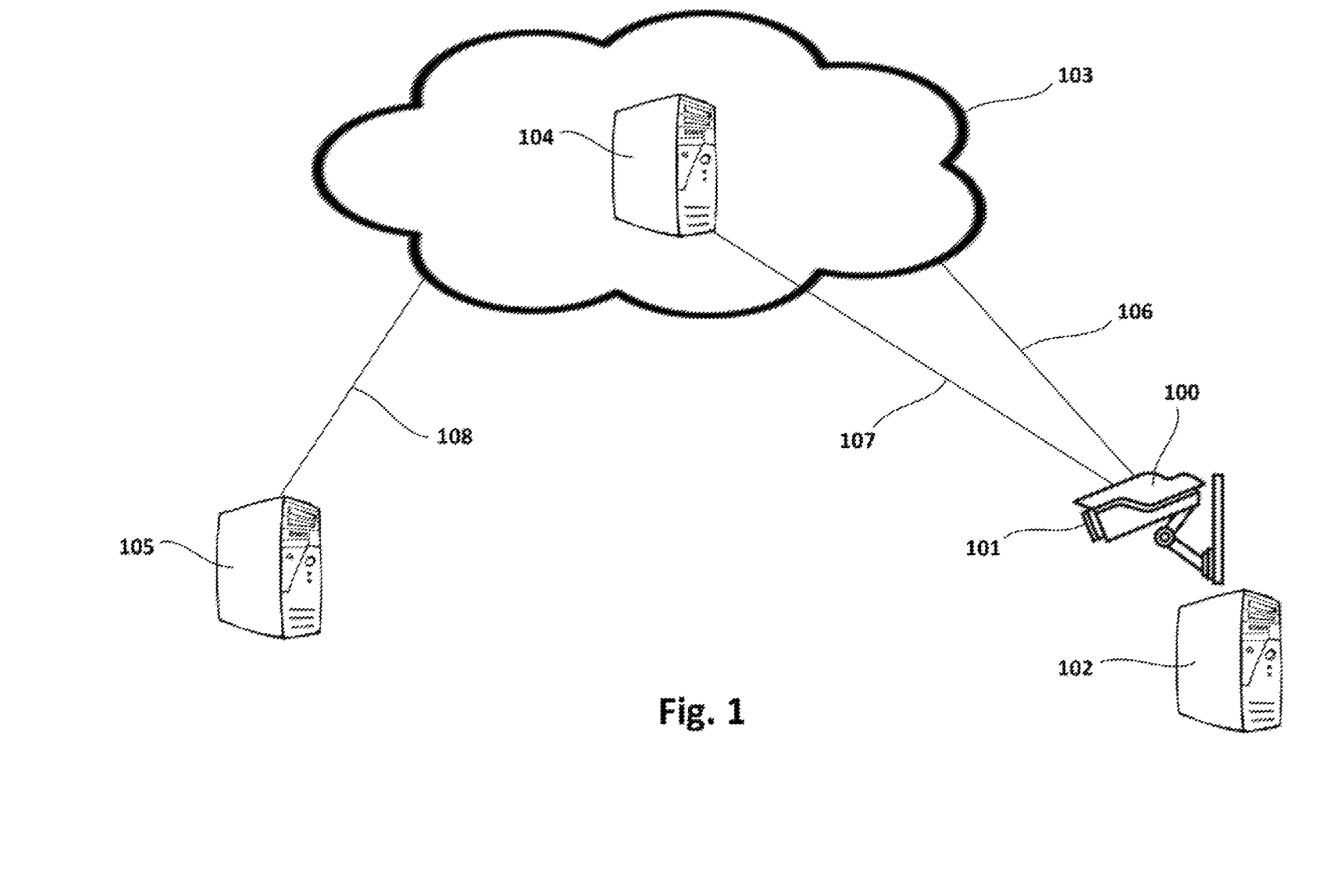
FIG. 1 is a schematic representation of a surveillance or vision system that may comprise a system according to examples for determining whether an image captured by a capturing device is clean or dirty.

FIG. 1 is a schematic representation of a surveillance or vision system that may comprise a system according to examples for determining whether an image captured by a capturing device is clean or dirty. The capturing device (e.g., a camera) 100 may be configured to capture images (e.g., photos, videos) of an environment through corresponding lens 101. The camera 100 is shown in the figure as a surveillance camera. However, other applications may be also considered, such as e.g., detection/vision cameras in a vehicle aimed at detecting obstacles, monitoring other systems of the vehicle, driving assistance, rear-view mirror system, etc. Such vision systems may be suitable for vehicles of any type and movable on any medium, such as e.g., roadways, railways, boats, airplanes, cars, etc.

In any of the mentioned applications and others, the lens 101 of the camera 100 may become dirty due to e.g., dust accumulation, mud splashes, malicious paintings, etc. When dirtiness of the lens is excessive, the camera 100 may produce images of insufficient quality. Therefore, it may be a concern to determine when the lens 101 becomes excessively dirty in order to undertake corresponding corrective action(s), such as e.g., activation of an automatic cleaning system, triggering of an alarm for manual cleaning, etc.

The camera 100 may be connectable with a computing system so that images from the camera 100 may be processed by the computing system for determining whether the lens 101 is clean or dirty. In some examples, the computing system may be arranged locally with respect to the camera 100, as indicated through reference 102. In particular, the computing system 102 may be internal to the camera 100. In other examples, the computing system may be a cloud system 104 connectable with the camera 100 through suitable connection 107. In still other examples, the computing system may be a remote system 105 connectable with the camera 100 through a communications network 103, such as e.g., the Internet. In this case, a corresponding connection 106 between the camera 100 and the network 103 and corresponding connection 108 between the network 103 and the remote system 105 may be implemented.

The computing systems 102, 104, 105 may include a system for determining lens cleanness/dirtiness according to the present disclosure. The system for determining lens cleanness/dirtiness may be totally included in any one of the computing systems 102, 104, 105, or may be distributed among several of the systems 102, 104, 105. In the latter case, for example, some modules of the system for determining lens cleanness/dirtiness may reside in one of the systems 102, 104, 105 and other modules may be comprised in another of the systems 102, 104, 105. In this distributed approach, systems 102, 104, 105 may thus cooperate to perform corresponding functionality of determining lens cleanness/dirtiness.

The system for determining lens cleanness/dirtiness may be implemented by hardware, software, or a combination thereof. The software may be a set of instructions (that is, a computer program) and then the system for determining lens cleanness/dirtiness may comprise a memory and a processor, embedding the set of instructions stored in the memory and executable by the processor. The instructions may comprise functionality to execute methods for determining lens cleanness/dirtiness.

In case the system for determining lens cleanness/dirtiness is implemented only by hardware, a controller may be, for example, a Complex Programmable Logic Device (CPLD), a Field Programmable Gate Array (FPGA), or an Application-Specific Integrated Circuit (ASIC).

In case the system for determining lens cleanness/dirtiness is a combination of hardware and software, the software may be a set of instructions (e.g., a computer program) and the hardware may be any electronic circuit capable of implementing the corresponding step or steps of the methods for determining lens cleanness/dirtiness.

The computer program may be embedded on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of methods for determining lens cleanness/dirtiness. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio, etc.

When the computer program is embodied in a signal that may be conveyed directly by a cable or other device, the carrier may be constituted by such cable or other device.

Alternatively, the carrier may be an integrated circuit in which the computer program is embedded, the integrated circuit being adapted for performing, or for use in the performance of, the methods for determining lens cleanness/dirtiness.

Figure 2:
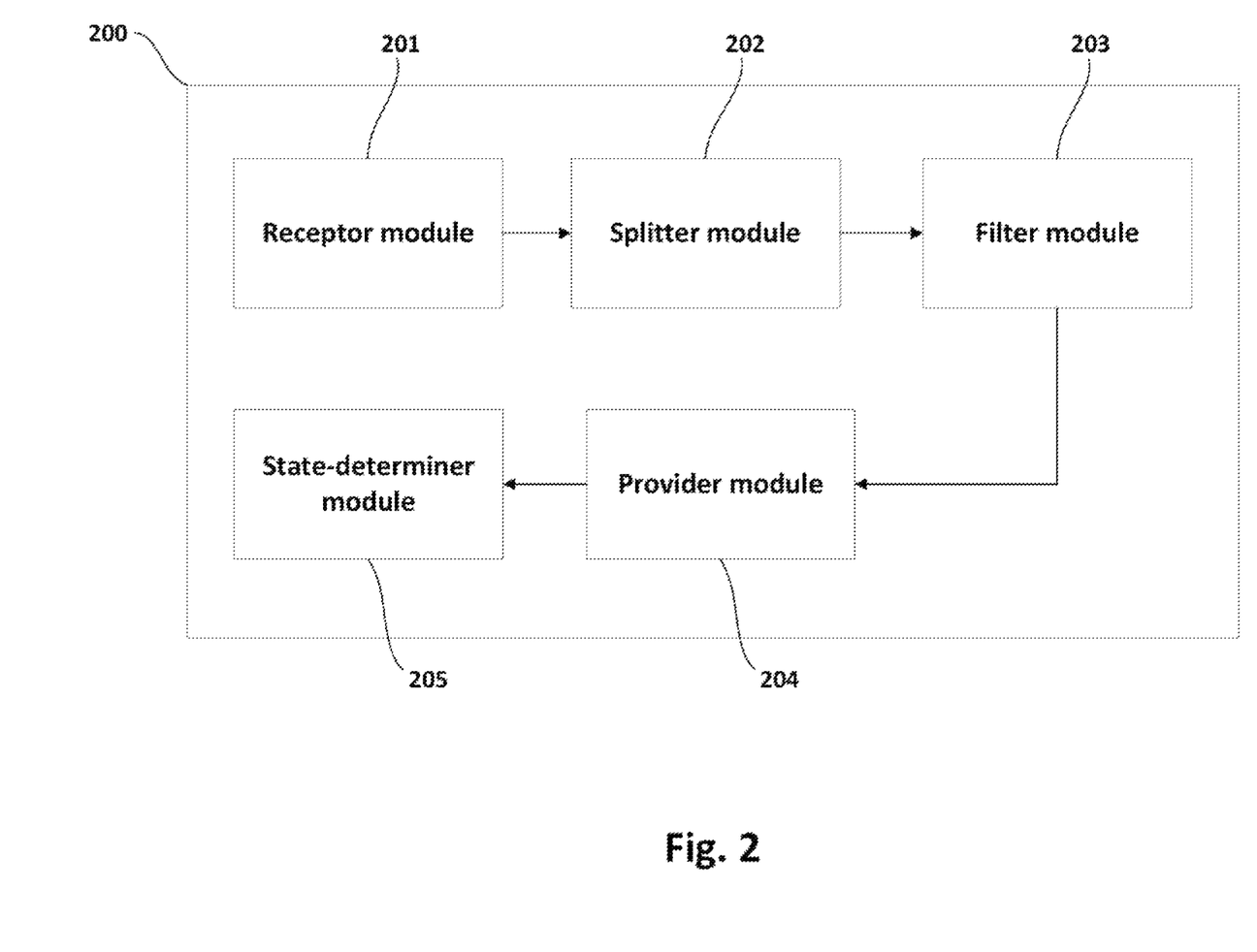
FIG. 2 is a block diagram schematically representing a system according to examples for determining whether an image captured by a capturing device is clean or dirty.

FIG. 2 is a block diagram schematically representing a system 200 according to examples for determining whether an image captured by a capturing device is clean or dirty. This system 200 may be used in a scenario similar to the one illustrated by FIG. 1, so references from the figure may be used in following description of FIG. 2. This system 200 may comprise a receptor module 201, a splitter module 202, a filter module 203, a provider module 204, and a state-determiner module 205.

The receptor module 201 may be configured to receive the image captured by the image capturing device 100 through the lens 101. The receptor module 201 may comprise communication functionalities if the system 200 is at a remote/cloud location with respect to the camera 100. If the system 200 is arranged locally with respect to the camera 100, the receptor module 201 may comprise physical connection functionalities between the camera 100 and the system 200. If the system 200 is internal to the camera 100, the receptor module 201 may comprise interface functionalities between image capturing hardware/software and cleanness/dirtiness determination software/hardware. Connection(s) between the camera 100 and the system 200 may be of any known wireless or wired type. Once the image has been received, the receptor module 201 may provide the image to the splitter module 202.

The splitter module 202 may be configured to split the received image into a plurality of image portions according to predefined splitting criteria. Any splitting criteria may be used for that end, such as e.g., a splitting into a matrix of n×m image portions which may be quadrangular, rectangular, etc. Smaller portions may be used to increase accuracy in determining the cleanness/dirtiness of the lens 101. Bigger (or larger) portions may be utilized to reduce the execution time in determining the cleanness/dirtiness of the lens 101. The size of the image portions may be predefined in such a way that a good balance between accuracy and execution time (efficiency) is achieved. Once the image has been split, the splitter module 202 may provide the image portions to the filter module 203.

The filter module 203 may be configured to perform, for each of (at least some of) the image portions, a Laplacian filter of the image portion to produce a feature vector including Laplacian filter features of the image portion. A feature vector may include Laplacian filter features such as e.g., a kurtosis, a mean, a variance, a moment of the Laplacian filter of the image portion, etc. A diversity of experiments performed by the inventors surprisingly revealed a good, accurate correlation between Laplacian filter features and cleanness/dirtiness condition of an image portion. The inventors further identified that the good correlation is effectively implementable through machine learning techniques, such as e.g., classification techniques. Once feature vectors of the image portions have been produced, the filter module 203 may provide the feature vectors to the provider module 204.

The provider module 204 may be configured to provide each of the produced feature vectors to a first machine learning module that has been trained to produce a clean/dirty indicator depending on corresponding feature vector.

The clean/dirty indicator may include a probabilistic value of cleanness or dirtiness of corresponding image portion. The first machine learning module may be comprised in the provider module 204 or may be external to the provider module 204. The first machine learning module may comprise e.g., a linear classifier, a Support Vector Machine (SVM), etc. or a combination of them. Any known machine learning method may be used to train off-line the first machine learning module depending on sample data satisfying a pre-known correlation between Laplacian filter features and cleanness/dirtiness probabilistic indicator/value. Once the clean/dirty indicators have been produced, the provider module 204 may provide the indicators to the state-determiner module 205.

The state-determiner module 205 may be configured to determine whether the image is clean or dirty depending on the clean/dirty indicators produced by the first machine learning module. The state-determiner module 205 may thus produce an overall probabilistic value indicating whether the whole lens is clean or dirty, depending on the clean/dirty indicators (at portion level) generated by the first machine learning module. The state-determiner module 205 may be based on any of the following state-determination approaches.

In a first state-determination approach, the clean/dirty indicators provided by the first machine learning module may be aggregated (added, accumulated) to produce an overall clean/dirty indicator of the image/lens, which may be compared to an overall clean/dirty threshold. If the overall clean/dirty indicator exceeds the overall clean/dirty threshold, a dirty state may be attributed to the lens. Otherwise, a clean state may be attributed to the lens. The overall clean/dirty threshold may be adjusted regularly or punctually depending on new known input data and corresponding expected output data. This way, accuracy of the method may be continuously improved along the life-cycle of the method (and corresponding system and software).

In a second state-determination approach, the clean/dirty indicators provided by the first machine learning module may be counted depending on whether portions are determined as clean or dirty. This counting may thus produce a number of clean portions and/or a number of dirty portions. The whole lens may be determined as clean or dirty depending on the number of clean portions and/or number of dirty portions. In an example, if the number of dirty portions exceeds a dirty portions threshold, a dirty state may be attributed to the lens. Otherwise, a clean state may be attributed to the lens. In another example, if the number of clean portions exceeds a clean portions threshold, a clean state may be attributed to the lens. Otherwise, a dirty state may be attributed to the lens. These clean/dirty portions threshold may be refined regularly or punctually depending on new known input data and corresponding expected output data. This way, accuracy of the method may be continuously improved along the life-cycle of the method (and corresponding system and software).

In a third state-determination approach, the clean/dirty indicators produced by the first machine learning module may be provided to a second machine learning module that has been trained to produce an overall clean/dirty indicator of the image depending on corresponding clean/dirty indicators of image portions. In some examples, the overall clean/dirty indicator of the image outputted by the second machine learning module may be directly assumed as the state of the lens. In other examples, the state of the lens may be obtained by performing some kind of transformation of the overall clean/dirty indicator outputted by the second machine learning module, depending on circumstances.

The second machine learning module may be comprised in the state-determiner module 205 or may be external to the state-determiner module 205. The second machine learning module may comprise e.g. a linear classifier, a Support Vector Machine (SVM), etc. or a combination of them. Any known machine learning method may be used to train off-line the second machine learning module depending on sample data satisfying a pre-known correlation between clean/dirty indicators at portion level and a global clean/dirty indicator of the whole image/lens. This way, accuracy of the method may be continuously improved along the life-cycle of the method (and corresponding system and software).

Any combination of the aforementioned state-determination approaches may cooperate in implementations of the state-determiner module 205 to produce more accurate results. For example, results from different sub-modules implementing different state-determination approaches may be combined to produce a combined clean/dirty indicator of the whole image/lens. This combination may be based on e.g., calculating an average indicator which may be assumed as the state finally attributed to the lens. This calculation of the average indicator may be a weighted calculation, wherein the indicator(s) associated to each state-determination approach may be weighted depending on e.g., a predefined confidence attributed to corresponding state-determination approach.

The system 200 may further comprise a context-based filtering module (not shown) configured to determine one or more dirty blocks of neighboring (contiguous) image portions with clean/dirty indicator denoting dirtiness (dirty portions), and to detect one or more edges of the one or more dirty blocks.

The context-based filtering module may be further configured to determine the sharpness in the one or more edges. The context-based filtering module may be yet further configured to adjust clean/dirty indicators of the dirty portions in the dirty blocks depending on the sharpness and/or the clean/dirty indicators of clean portions that are adjacent to the edges. A clean portion is a portion with clean/dirty indicator denoting cleanness.

The inventors identified that an imaged variation from clean to dirty, or vice versa, on a lens is gradual rather than abrupt. Thus, an excessive sharpness may denote an abrupt variation that may not generally correspond to dirtiness on the lens. For example, a pronounced sharpness (abruptness) in an image captured by an on-board vehicle camera may be more likely to correspond to e.g. road margins, road lines, etc. rather than to dirtiness on the lens. The proposed context-based filtering may thus permit correcting or attenuating false detections of dirtiness based on reducing the dirtiness probability (clean/dirty indicator) when excessively abrupt variations/edges are detected.

Sharpness may be determined depending on e.g. a kurtosis of a dirty portion included in an edge of a dirty block. The sharpness may be inputted to a third machine learning module (e.g., linear classifier, SVM, etc.) that has been trained to output a cleanness/dirtiness probability variation depending on the sharpness. Then, the clean/dirty indicators of dirty portions in a dirty block may be adjusted by varying them according to the cleanness/dirtiness probability variation produced by the third machine learning module. A variation of cleanness/dirtiness probability may comprise a probability value to be added or subtracted to corresponding clean/dirty indicator. Taking this into account, an image portion that has been previously classified as dirty may be re-classified as clean as a result of the suggested context-based filtering. Sharpness of an image portion may be determined depending on Laplacian filter features contained in the feature vector of the image portion produced by filter module 203.

The aforementioned determination of cleanness/dirtiness probability variations may (additionally or alternatively) comprise determining an overall cleanness of the clean portions that are adjacent to an edge. This overall cleanness may correspond to e.g., an average, mean, maximum value, aggregation, etc. of the clean/dirty indicators of the adjacent clean portions. This overall cleanness may e.g., be taken into account by the aforementioned third machine learning module to produce corresponding cleanness/dirtiness probability variation to be propagated to dirty portions in dirty block. The higher is the cleanness denoted by the overall cleanness, the higher may be the influence of the adjacent clean portions in cleanness/dirtiness probability variation. The lower is the cleanness denoted by the overall cleanness, the lower may be the influence of the adjacent clean portions in cleanness/dirtiness probability variation.

Figure 4A:
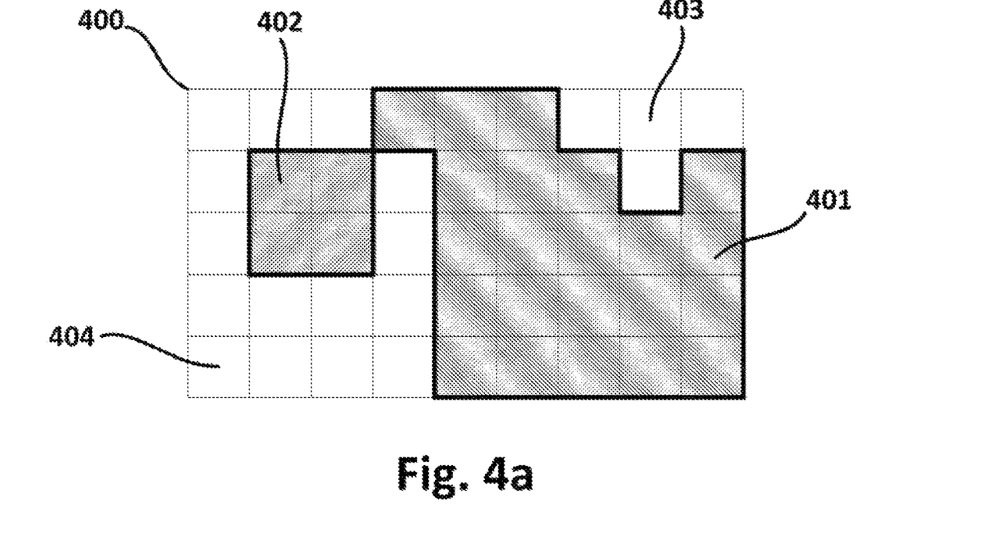
FIGS. 4a and 4b schematically illustrate context-based filters of example suitable for methods according to the present disclosure.
Figure 4B:
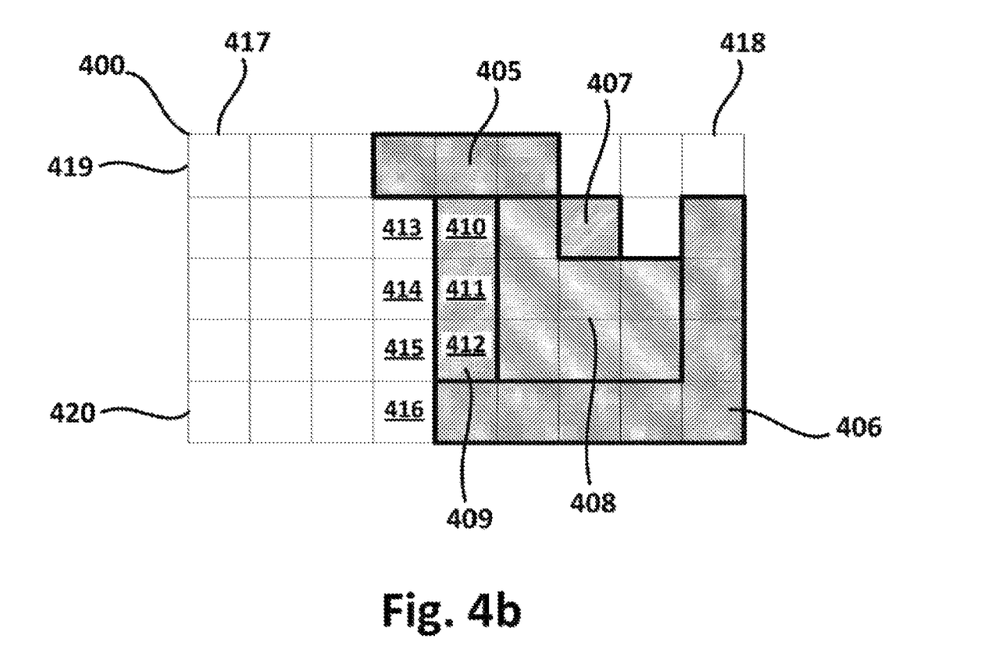

FIGS. 4a and 4b schematically illustrate context-based filters of example suitable for methods according to the present disclosure. FIG. 4a illustrates a received image 400 with determined clean portions 403, 404 (white squares) and determined dirty portions 401, 402 (shaded squares). A clean portion is an image portion with clean/dirty indicator denoting cleanness, and a dirty portion is an image portion with clean/dirty indicator denoting dirtiness. Two blocks 401, 402 of neighboring image portions with clean/dirty indicator denoting dirtiness may be determined in the particular example shown. The blocks of dirty portions may be also denominated as Regions of Interests (ROIs) 401, 402.

For the sake of simplicity, FIG. 4b focuses on one of the blocks or ROIs 401, 402 of neighboring dirty portions (or cells) from a previous figure. In particular, block of dirty portions 401 is schematically illustrated in more detail. Edges of the block 401 may be determined by selecting those dirty portions (or cells) in the block 401 having more than one adjacent clean portion/cell. This selection of dirty portions with more than one adjacent clean portion may disregard the outermost portions of the image 400. Outermost portions/cells (of the image) that are included in a ROI of dirty portions/cells may be also denominated as ROI border cells.

In the particular example shown, dirty cell 410 has two adjacent clean cells 413, 414, dirty cell 411 has three adjacent clean cells 413-415, and dirty cell 412 has three adjacent clean cells 414-416. Similarly, dirty portion/cell 407 is shown having three adjacent clean portions/cells. Dirty portions 410-412 may thus form an edge 409 of the block/ROI 401 and single dirty portion 407 may form another edge of the block/ROI 401. Portions/cells forming an edge of a ROI may also be denominated as ROI contour cells.

The outermost portions of the image 400 may be those portions included in any of the leftmost column 417, rightmost column 418, top row 419 and bottom row 420 of portions in the image 400. In the particular example shown, three portions forming the region 405 and eight portions forming the region 406 may be discarded in the selection of dirty portions with more than one adjacent clean portion. None of the portions of the regions 405 and 406 may thus be comprised in an edge of the block 401. In other words, none of the ROI border cells 405, 406 may be considered as being ROI contour cells 407, 409. Similarly, edge 407 may be discarded because two of the three adjacent clean cells are outermost cells of the image. In particular, the two adjacent clean cells are included in top row 419 of the image 400.

Once edge(s) 409 of the block 401 has been determined, corresponding sharpness may be determined for the image portion(s) in the edge(s). Such sharpness may be determined according to any known method aimed at that end, such as e.g., in the manners proposed in other parts of the description. For each of (all or part of) the determined sharpness, a verification of whether the sharpness is above a predefined abruptness threshold may be performed. In case of affirmative/true result of the verification, the image portion with such sharpness may be kept as candidate to be its clean/dirty indicator adjusted. Otherwise, the image portion with such sharpness may be discarded.

The abruptness threshold may be predetermined to denote an abrupt/pronounced transition from clean to dirty (or vice versa) when sharpness is above the threshold, or a smooth/gradual variation when sharpness is not above the threshold. Equality between sharpness and threshold may be interpreted as denoting an abrupt or gradual transition indistinctly. The abruptness threshold may be predetermined through e.g., a linear classifier trained with pre-known input(s) and output(s) representing a diversity of abrupt and gradual variations as exhaustive as possible.

The clean/dirty indicators (i.e., cleanness/dirtiness probabilistic/confidence values) of the cells in the ROI 401 may be adjusted depending on an overall cleanness of the clean portions 413-416 adjacent to the edge/contour 409.

The clean/dirty indicators of the cells in the ROI 401 may be adjusted according to the above principle depending on an alpha factor calculated (for each or some of the contours/edges) through the following formula:

$$\text{adjusted weight contour} = \frac{\text{\# cells region contour}}{\text{\# cells region contour} + \text{\# cells border of } ROI} \times \text{WEIGHT\_CONTOUR}$$

wherein:

adjusted weight contour is the alpha factor of corresponding contour/edge, cells region contour corresponds to the number of cells in the contour (in the example of FIG. 4b, the contour 409 has three cells 410-412), cells border of ROI corresponds to the number of cells in the border(s) of the ROI (in the example of FIG. 4b, the number of border cells in the ROI is eleven because border 405 has three cells and border 406 has eight cells), and WEIGHT_CONTOUR corresponds to a trained factor that may have been (re)defined by training e.g. a linear classifier with pre-known input(s) and output(s) representing a diversity of exemplary situations.

Once alpha factor (adjusted weight contour) has been calculated for corresponding ROI 401, a measurement of maximum/higher clean/dirty indicators of adjacent clean cells may be determined. Determining the measurement may comprise selecting, for each (or some) of the cells in corresponding contour, the clean/dirty indicator/confidence of the adjacent clean cells denoting maximum/higher cleanness. In the particular example shown, the maximum/higher clean/dirty indicator of clean cells 413-414 may be selected for dirty cell 410, the maximum/higher clean/dirty indicator of clean cells 413-415 may be selected for dirty cell 411, and the maximum/higher clean/dirty indicator of clean cells 414-416 may be selected for dirty cell 412.

Once the above selection of maximum/higher clean/dirty indicators has been completed, the selected maximum/higher clean/dirty indicators (or probabilities/confidences) may be added. The result of the addition may then be divided by the number of cells/portions in the contour/edge that have been considered, thereby obtaining a confidence that cleanness of adjacent clean cells is inheritable by corresponding contour. The following formula may thus be used for that end:

$$\text{clean confidence contour} = \frac{\Sigma_{i \in region\ contour}\ \text{maximum clean } confidence_i}{\text{\# cells region contour}}$$

wherein:

clean confidence contour is the confidence that the contour inherits the cleanness of its adjacent clean cells, cells region contour is the number of cells in corresponding contour (in the example of FIG. 4b, the contour 409 has three cells 410-412), maximum clean $confidence_i$ is the clean/dirty indicator/confidence of the clean cell adjacent to ith dirty cell in the contour that has been selected because it reflects maximum/higher cleanness in comparison with the other clean cells adjacent to the ith dirty cell, and $\Sigma_{i \in region\ contour}$ maximum clean $confidence_i$ is the addition of the clean/dirty indicators/confidences of the adjacent clean cells selected for each (or some) of the dirty cells in the contour.

Once clean confidence contour has been determined, the clean/dirty indicator/confidence of the cells in the ROI may be adjusted with higher or lower effect depending on corresponding adjusted weight contour. This adjustment may be determined through the following formula:

$$\text{corrected clean confidence inner cell} =$$
$$\text{clean confidence inner cell} \times (1 - \text{adjusted weight contour}) +$$
$$\text{clean confidence contour} \times \text{adjusted weight contour}$$

wherein:

corrected clean confidence inner cell is the adjusted clean/dirty indicator or confidence of corresponding cell in the ROI, and clean confidence inner cell is the current clean/dirty indicator or confidence of the cell (before adjustment).

The system 200 may further comprise a time filtering module (not shown) configured to perform a time filtering on clean/dirty indicators of an image portion in different images captured over time by the capturing device. When a series of images has been captured by the camera 100, a particular image portion may reveal changing conditions (clean/dirty indicators) from one image to another in the series of images. The proposed time filtering may comprise detecting outlier indicators that may be discarded, corrected, stored for posterior analysis, etc.

Detection of outliers may comprise determining a digest value (e.g. maximum value, mean value, median value, etc.) of the clean/dirty indicators of corresponding image portion, and determining whether a deviation of the clean/dirty indicators with respect to the digest value exceeds a predefined deviation threshold. Those clean/dirty indicators exceeding the predefined deviation threshold may then be classified as outliers. When a clean/dirty indicator of a portion in an image taken at time T has a big deviation with respect to the digest value, and clean/dirty indicators of the portion in other images taken at times T+Δ and/or T−Δ have a much smaller deviation, this may indicate that something abnormal has occurred. In this case, corrective actions may be performed, such as e.g., discarding the abnormal or outlier indicator, correcting the outlier indicator (based on e.g., interpolation techniques), storing the outlier indicator for later analysis and resolution, etc.

The proposed time filtering may be applied to all the image portions of images in the series of images captured by the camera 100. Image intervals/ranges in the series including a predefined number of images may be considered to perform such a time filtering at portion level.

The system 200 may further comprise a Laplacian filtering module (not shown) configured to perform a Laplacian filtering on corresponding image at pixel level. This filtering may comprise determining a Laplacian convolution kernel and applying the Laplacian convolution kernel to each pixel of the image. The Laplacian convolution kernel may be predefined in the form of a typical matrix configuration such as e.g., [0 1 0; 1 −4 1; 0 1 0]. This matrix (or similar) may be convoluted by the value of each pixel in the image with consequent affectation to contiguous pixels. Laplacian filters are derivative filters that may facilitate the finding of areas of rapid change (edges) in an image. Therefore, the Laplacian filter may be performed to facilitate the edge (and sharpness) detection performed by the context-based filtering module (as described in other parts of the disclosure). The Laplacian filtering may be performed (at pixel level) individually on all the images captured by the camera 100.

Figure 3:
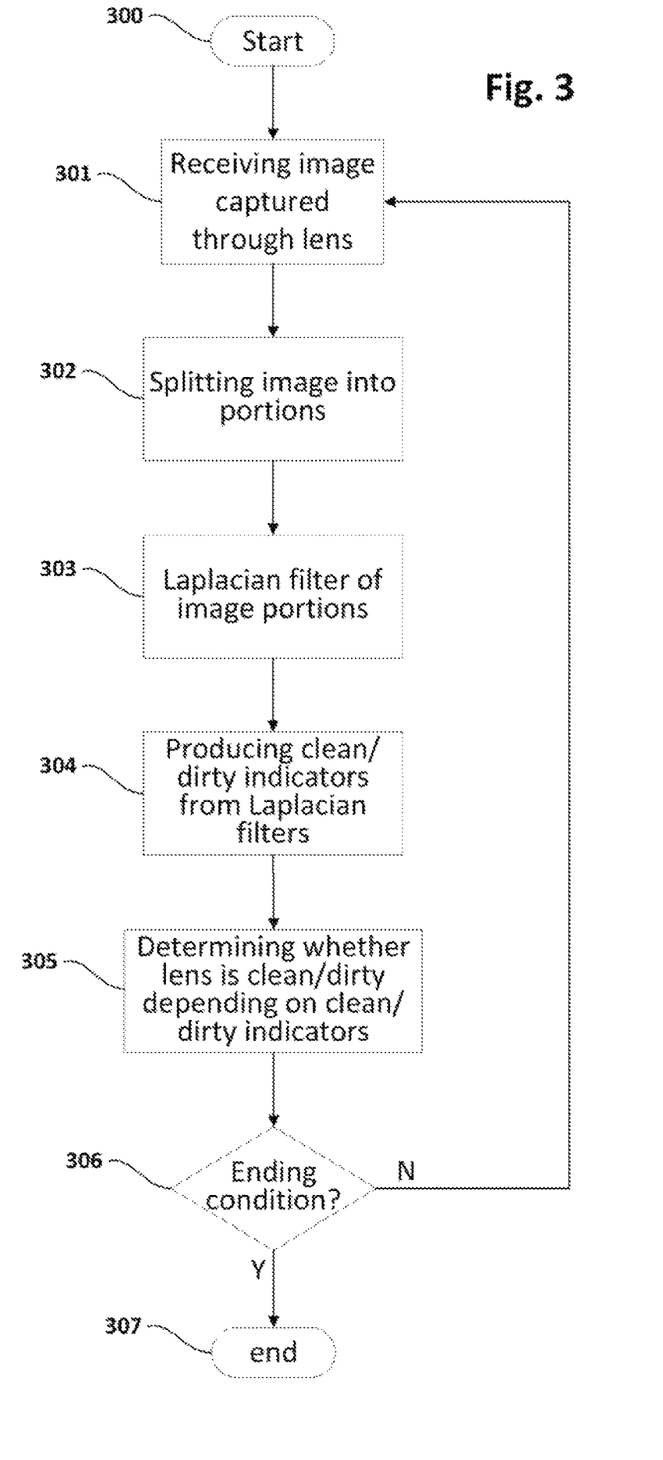
FIG. 3 is a flowchart schematically illustrating methods according to examples for determining whether an image captured by a capturing device is clean or dirty.

FIG. 3 is a flowchart schematically illustrating methods according to examples for determining whether an image captured by a capturing device is clean or dirty. These methods may be performed by systems such as the ones described with respect to previous figures. Number references from FIGS. 1 and 2 may thus be used in the following description of FIG. 3.

At block 300, the method may be started as a result of e.g., receiving by the system 200 a petition requesting initiation of the method. This request may be automatically generated e.g., when corresponding vehicle, surveillance system, vision system, etc. has been turned on.

At block 301, an image captured by the camera 100 through the lens 101 may be received by the system 200. This functionality may be performed by the receptor module 201 of the system 200. Functional principles commented about the module 201 may be similarly considered with respect to this block 301.

At block 302, the received image may be split into a plurality of image portions according to predefined splitting criteria. This function may be performed by the splitter module 202 of the system 200. Functional details commented regarding the module 202 may be similarly taken into account with respect to this block 302.

At block 303, a Laplacian filter of each of at least some of the image portions (from block 302) may be performed to produce a feature vector including Laplacian filter features of the image portion. This functionality (Laplacian filter at image portion level) may be carried out by the filter module 203 of the system 200. Fundamentals explained with regard to the module 203 may be similarly contemplated in relation to this method block 303.

At block 304, each of at least some of the produced feature vectors (from block 303) may be provided to a first machine learning module that has been trained to produce a clean/dirty indicator depending on corresponding feature vector. This function may be executed by the provider module 204 of the system 200. Functional details discussed with respect to the module 204 may be similarly applied to this block 304.

At block 305, a state of the lens may be determined indicating whether the lens is clean or dirty depending on the clean/dirty indicators outputted by the first machine learning module. This functionality may be realized by the state-determiner module 205 of the system 200. Functional explanations provided with respect to the module 205 may be similarly applied to this block 305.

At block 306, the method may include a verification of whether a predefined ending condition is satisfied. In case of positive (or true) result of the verification, a transition to block 307 may be performed for ending the execution of the method. Otherwise, the method may loop back to block 301 for receiving a new image and therefore starting a new iteration of the method.

The final condition may comprise a petition requesting completion of the method, in which case the method (computer program) may be completely finalized (at block 307). The final condition may consider e.g., a maximum elapsed time without receiving any image, in which case the method/program may be transitioned (at block 307) to e.g., a standby state. At block 307, the standby state may cause deactivation of the computer program while waiting for a new image and its reactivation upon reception of the new image. The final condition may be satisfied when e.g., the vehicle, the surveillance system, vision system, etc. has been turned off.

The method may additionally comprise, at a first further block (not shown), performing a context-based filtering on image portions, and associated clean/dirty indicators, of corresponding image captured by the camera 100. This filtering may be performed by the previously described context-based filtering module, taking into account same or similar functional principles as described in relation to the module.

The method may still additionally comprise, at a second further block (not shown), performing a time filtering on clean/dirty indicators of an image portion in different images captured over time by the capturing device. This filtering may be performed by the previously described time filtering module, based on same or similar functional details as described with respect to the module.

The method may additionally comprise, at a third further block (not shown), performing a Laplacian filtering at pixel level on corresponding image captured by the camera 100 through the lens 101. This filtering may be performed by the Laplacian filtering module described before, according to same or similar functional essentials as commented with respect to the module.

The methods disclosed in the present detailed description (of examples) are aimed at determining whether an image captured by a camera (or similar device) is clean or dirty due to cleanness or dirtiness of a lens of the camera.

However, as commented in other parts of the description, dirty captured images may result from a variety of other situations. For instance, moisture in the camera (due to e.g. deficient water tightness) may negatively influence inner components of the camera (e.g. capturing sensors) which may also provoke dirtiness on captured images. The disclosed methods may thus be used to determine dirtiness in/on any component of the camera that may provoke dirtiness on captured images, such as e.g. lenses, sensors, etc.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow.

What is claimed is:

1. A method of determining whether an image captured by an image capturing device is clean or dirty, the method comprising:
   receiving the image captured by the image capturing device;
   splitting the received image into a plurality of image portions according to a predefined-splitting-criteria;
   performing, for each of at least some of the plurality of image portions, a filter to produce a feature vector for each of the at least some of the plurality of image portions;
   providing each of at least some of the produced feature vectors to a first machine learning module that has been trained to produce a clean/dirty indicator depending on a corresponding feature vector, the clean/dirty indicator including a probabilistic value of cleanness or dirtiness of a corresponding image portion;
   determining whether the image is clean or dirty depending on clean/dirty indicators produced by the first machine learning module;
   performing a context-based filtering on corresponding image as a whole, wherein the filtering includes determining one or more dirty blocks including neighboring dirty portions, wherein a dirty portion is a portion with a clean/dirty indicator denoting dirtiness;
   detecting one or more edges of the one or more dirty blocks;

determining a sharpness in the one or more edges; and adjusting clean/dirty indicators of the neighboring dirty portions in the one or more dirty blocks depending on at least one of the sharpness or the clean/dirty indicators of clean portions that are adjacent to the edges, wherein a clean portion is a portion with a clean/dirty indicator denoting cleanness.

2. The method of claim 1, wherein the first machine learning module comprises a linear classifier.

3. The method of claim 1, wherein determining whether the image is clean or dirty comprises:

aggregating clean/dirty indicators provided by the first machine learning module to produce an overall clean/dirty indicator of the image; and determining whether the image is clean or dirty depending on whether the overall clean/dirty indicator of the image exceeds an overall clean/dirty threshold.

4. The method of claim 1, wherein determining whether the image is clean or dirty comprises:

counting the clean/dirty indicators provided by the first machine learning module to determine a number of clean portions and/or a number of dirty portions; and determining whether the image is clean or dirty depending on whether the number of clean portions exceeds a clean portions threshold and/or the number of dirty portions exceeds a dirty portions threshold.

5. The method of claim 1, wherein determining whether the image is clean or dirty comprises:

providing the clean/dirty indicators produced by the first machine learning module to a second machine learning module that has been trained to produce an overall clean/dirty indicator of the image depending on corresponding clean/dirty indicators of image portions; and determining whether the image is clean or dirty depending on the overall clean/dirty indicator of the image produced by the second machine learning module.

6. The method of claim 1, wherein the filter is a Laplacian filter that includes Laplacian filter features, and wherein the Laplacian filter features results from the Laplacian filter of a corresponding image portion that comprises at least one of a kurtosis, a mean, a variance, an average grey value and one or more moments of the Laplacian filter of the image portion.

7. The method of claim 1, further comprising performing a time filtering on clean/dirty indicators of a corresponding image portion in different images captured over time by the image capturing device.

8. The method of claim 7, wherein performing the time filtering comprises determining a digest value from a plurality of clean/dirty indicators of the corresponding image portion and determining one or more outliers depending on a deviation between the plurality of clean/dirty indicators and the digest value.

9. The method of claim 8, wherein the digest value is one of a maximum value, a mean value, or a median value of the plurality of clean/dirty indicators of the corresponding image portion.

10. The method of claim 1, wherein adjusting the clean/dirty indicators of the image portions in the one or more dirty blocks includes at least one of:

selecting the sharpness that is above an abruptness threshold;

adjusting the clean/dirty indicators depending on the selected sharpness which denote abrupt variation from cleanness to dirtiness or that denote abrupt variation from dirtiness to cleanness; and determining an overall cleanness of the adjacent clean portions and adjusting the clean/dirty indicators depending on the overall cleanness of the adjacent clean portions.

11. The method of claim 1, further comprising performing a Laplacian filtering at a pixel level on a corresponding image, where the filtering includes determining a Laplacian convolution kernel and applying the Laplacian convolution kernel to each pixel of the image.

12. The method of claim 1, wherein the filter is a Laplacian filter producing Laplacian filter features included in the feature vector.

13. A system for determining whether an image captured by a capturing device is clean or dirty, the system comprising:

a receptor module to receive the image captured by the image capturing device;

a splitter module to split the received image into a plurality of image portions according to a predefined-splitting-criteria;

a filter module to perform, for each of at least some of the image portions, a filter of the image portion to produce a feature vector of the image portion; a provider module to provide each of at least some of the produced feature vectors to a first machine learning module that has been trained to produce a clean/dirty indicator depending on corresponding feature vector, the clean/dirty indicator including a probabilistic value of cleanness or dirtiness of corresponding image portion;

a state-determiner module to determine whether the image is clean or dirty depending on the clean/dirty indicators produced by the first machine learning module; and a time filtering module to time filtering on clean/dirty indicators of a corresponding image portion in different images captures over time by the image capturing device, wherein the time filtering including determining a digest value from a plurality of clean/dirty indicators of the corresponding image portion and determining one or more outlier depending on a deviation between the plurality of clean/dirty indicators and the digest value.

14. A method comprising:

receiving a captured image;

splitting the captured image into a plurality of image portions according to a predefined-splitting-criteria;

performing, for each of at least some of the plurality of image portions, a filter to produce a feature vector for each of the at least some of the plurality of image portions;

providing each of at least some of the produced feature vectors to a first machine learning module that produces a clean/dirty indicator based on a corresponding feature vector, the clean/dirty indicator including a probabilistic value of cleanness or dirtiness of a corresponding image portion;

determining whether the image is clean or dirty based on clean/dirty indicators;

performing a context-based filtering on corresponding image as a whole, wherein the filtering includes determining one or more dirty blocks including neighboring dirty portions, wherein a dirty portion is a portion with a clean/dirty indicator denoting dirtiness;

detecting one or more edges of the one or more dirty blocks;

determining a sharpness in the one or more edges; and adjusting clean/dirty indicators of the neighboring dirty portions in the one or more dirty blocks depending on at least one of the sharpness or the clean/dirty indicators of clean portions that are adjacent to the edges, wherein a clean portion with a clean/dirty indicator denoting cleanness.

15. The method of claim 14, wherein determining whether the image is clean or dirty comprises:
   aggregating clean/dirty indicators to produce an overall clean/dirty indicator of the image; and
   determining whether the image is clean or dirty depending on whether the overall clean/dirty indicator of the image exceeds an overall clean/dirty threshold.

16. The method of claim 14, wherein determining whether the image is clean or dirty comprises:
   counting the clean/dirty indicators to determine a number of clean portions and/or a number of dirty portions; and
   determining whether the image is clean or dirty based on whether the number of clean portions exceeds a clean portions threshold and/or the number of dirty portions exceeds a dirty portions threshold.

17. The method of claim 14, wherein determining whether the image is clean or dirty comprises:
   providing the clean/dirty indicators produced by the first machine learning module to a second machine learning module that produces an overall clean/dirty indicator of the image depending on corresponding clean/dirty indicators of the image portions; and
   determining whether the image is clean or dirty depending on the overall clean/dirty indicator of the image produced by the second machine learning module.

18. The method of claim 14, wherein the filter is a Laplacian filter that includes Laplacian filter features, and wherein the Laplacian filter features result from the Laplacian filter of a corresponding image portion that comprises at least one of a kurtosis, a mean, a variance, an average grey value and one or more moments of the Laplacian filter of the image portion.

* * * * *